United States Patent
Tung et al.

(10) Patent No.: US 7,916,866 B2
(45) Date of Patent: Mar. 29, 2011

(54) APPARATUS FOR DESCRAMBLING A DATA RETRIEVED FROM AN OPTICAL STORAGE MEDIUM, AND METHOD THEREFOR

(75) Inventors: Chien-Hsun Tung, Taichung (TW); Ying-Che Hung, Taipei Hsien (TW)

(73) Assignee: MediaTek, Inc., Hsinchu (TW)

( * ) Notice: Subject to any disclaimer, the term of this patent is extended or adjusted under 35 U.S.C. 154(b) by 1142 days.

(21) Appl. No.: 11/437,888

(22) Filed: May 19, 2006

(65) Prior Publication Data

US 2007/0271491 A1 Nov. 22, 2007

(51) Int. Cl.
*H04N 7/167* (2006.01)
(52) U.S. Cl. .......... 380/240; 713/189; 713/193
(58) Field of Classification Search .......... 380/240, 380/210; 714/752; 713/189, 193
See application file for complete search history.

(56) References Cited

U.S. PATENT DOCUMENTS

| | | | |
|---|---|---|---|
| 5,426,627 A * | 6/1995 | Saito | 369/53.29 |
| 6,269,220 B1 * | 7/2001 | Jeong et al. | 386/109 |
| 6,282,367 B1 * | 8/2001 | Cho et al. | 386/126 |
| 6,745,349 B1 * | 6/2004 | Suzuki et al. | 714/48 |
| 7,055,082 B2 * | 5/2006 | Mori et al. | 714/768 |
| 7,346,830 B2 * | 3/2008 | Freissmann et al. | 714/763 |
| 2002/0191967 A1 | 12/2002 | Freissmann et al. | |
| 2004/0109398 A1 * | 6/2004 | Wu et al. | 369/47.3 |
| 2004/0190408 A1 * | 9/2004 | Shiraishi et al. | 369/47.1 |
| 2004/0233807 A1 * | 11/2004 | Wu et al. | 369/47.32 |

FOREIGN PATENT DOCUMENTS

CN 1409856 A 4/2003
WO WO 9957724 A1 * 11/1999

OTHER PUBLICATIONS

H-C Chang, C. Shung, Reed-Solomon Product-code (RS-PC) Decoder for DVD Applications /Paper SP 24.7 XP-000862225 1998, IEEE.*

* cited by examiner

*Primary Examiner* — Benjamin E Lanier
*Assistant Examiner* — Samson Lemma
(74) *Attorney, Agent, or Firm* — Patterson Thuente Christensen Pedersen, P.A.

(57) ABSTRACT

An apparatus for descrambling a data retrieved from an optical storage medium comprises a decoder, a memory and a descramble engine. The decoder decodes the data and generates address information corresponding to an address on the optical storage medium, wherein the address responding to a part of the data having been decoded. The memory stores the address information and the part of the data. The descramble engine continuously descrambles the part of the data by retrieving the address information. A method for descrambling a data retrieved from an optical storage medium comprises the following steps: decoding the data; generating address information corresponding to an address on the optical storage medium; storing the address information and a part of the data having been corrected; and descrambling the part of the data continuously by retrieving the address information after the data decoding is interrupted.

18 Claims, 3 Drawing Sheets

US 7,916,866 B2

APPARATUS FOR DESCRAMBLING A DATA RETRIEVED FROM AN OPTICAL STORAGE MEDIUM, AND METHOD THEREFOR

CROSS-REFERENCES TO RELATED APPLICATIONS

Not applicable.

BACKGROUND OF THE INVENTION

1. Field of the Invention

The present invention relates to an apparatus for descrambling a data retrieved from an optical storage medium and a method therefor; more specifically, relates to an apparatus and method for descrambling a data retrieved from an optical storage medium by activating an linear feedback shift register (LFSR) according to address information that is stored in a memory.

2. Descriptions of the Related Art

To retrieve a data that is recorded on an optical storage medium, an optical access system is required. As shown in FIG. 1, an optical access system 1 of the prior art comprises a servo interface 101, a decoder 103, a memory 105, a firmware 107, and an interface 109. The servo interface 101 receives a data 102 that is recorded on an optical storage medium, such as an optical disc, and transmits the data 102 to the decoder 103. The decoder 103 generates a decoded data 104 by performing, for example, error correction and error detection code (EDC) calculation on the data 102. The decoded data 104 is transmitted to the memory 105 to be temporarily stored. The interface 109 comprises a linear feedback shift register (LFSR) for descrambling the decoded data 104 to generate a digital data 106 which is recognizable for a host to be proceeded. The firmware 107 is configured to generate an initial value 108 to initialize the LFSR before the interface 109 descrambles the decoded data 104.

For BDs (blu-ray discs), recorded data are arranged in clusters each of which comprises 32 data frames and protected by 2 kinds of error correction mechanism, long distance code (LDC) and burst indicator subcode (BIS). The LDC comprises (248, 216, 33) Reed-Solomon codewords, and is used to correct random errors and burst errors. The BIS comprises (62, 30, 33) Reed-Solomon codewords, and is used to indicate long burst errors. Each data frame comprises 2052-byte data and a 4-byte EDC. Both of the 2052-byte data and the EDC are descrambled by the LFSR. To initialize the LFSR, some shift registers of the LFSR are required to be preset with the initial value 108 derived from physical sector numbers associated with data frames. Besides, the initial value 108 should be used for all 32 data frames in the same cluster.

For HDDVDs, one data frame comprises 2048-byte data and a 4-byte EDC. Both of the 2048-byte data and the EDC are descrambled by the LFSR. Similarly, some shift registers of the LFSR are required to be preset with the initial value 108 when the LFSR is initialized. The same initial value 108 is used for 16 consecutive data frames.

The firmware 107 is required to be set before data descrambling and decoding begin. Once the data decoding is interrupted by, for example, reading a replacement for a defect from an optical storage medium, the firmware 107 must re-count to re-initialize the LFSR. This seriously influences the processing speed. Accordingly, a solution to avoid re-initializing the LFSR is desired in the industrial field.

SUMMARY OF THE INVENTION

One object of this invention is to provide an apparatus for descrambling a data retrieved from an optical storage medium. The apparatus comprises a decoder, a memory, and a descramble engine. The decoder decodes the data and generates address information corresponding to an address on the optical storage medium, wherein the address responds to a part of the data having been decoded. The memory stores the address information and the part of the data. The descramble engine continues descrambling the part of the data by retrieving the address information after the data decoding is interrupted.

Another object of this invention is to provide a system for processing a data retrieved from an optical storage medium. The system comprises a servo interface, a decoder, a memory, and an interface. The servo interface inputs the data. The decoder decodes the data and generates address information corresponding to an address on the optical storage medium, wherein the address responds to a part of the data having been decoded. The memory stores the address information and the part of the data. The interface comprises a descramble engine for continuing descrambling the part of the data by retrieving the address information after the data decoding is interrupted, and outputs the descrambled data.

Another object of this invention is to provide a method for descrambling a data retrieved from an optical storage medium. The method comprises the following steps: decoding the data; generating address information corresponding to an address on the optical storage medium; storing the address information and a part of the data having been decoded; and descrambling the part of the data continuously by retrieving the address information after the data decoding is interrupted.

After the data decoding is interrupted, the present invention may activate the LFSR in response to the address information that is stored in the memory. When the part of the data continues descrambling, the LFSR does not have to be re-initialized by a firmware.

The detailed technology and preferred embodiments implemented for the subject invention are described in the following paragraphs accompanying the appended drawings for people skilled in this field to well appreciate the features of the claimed invention.

DESCRIPTION OF THE PREFERRED EMBODIMENT

Figure 2:
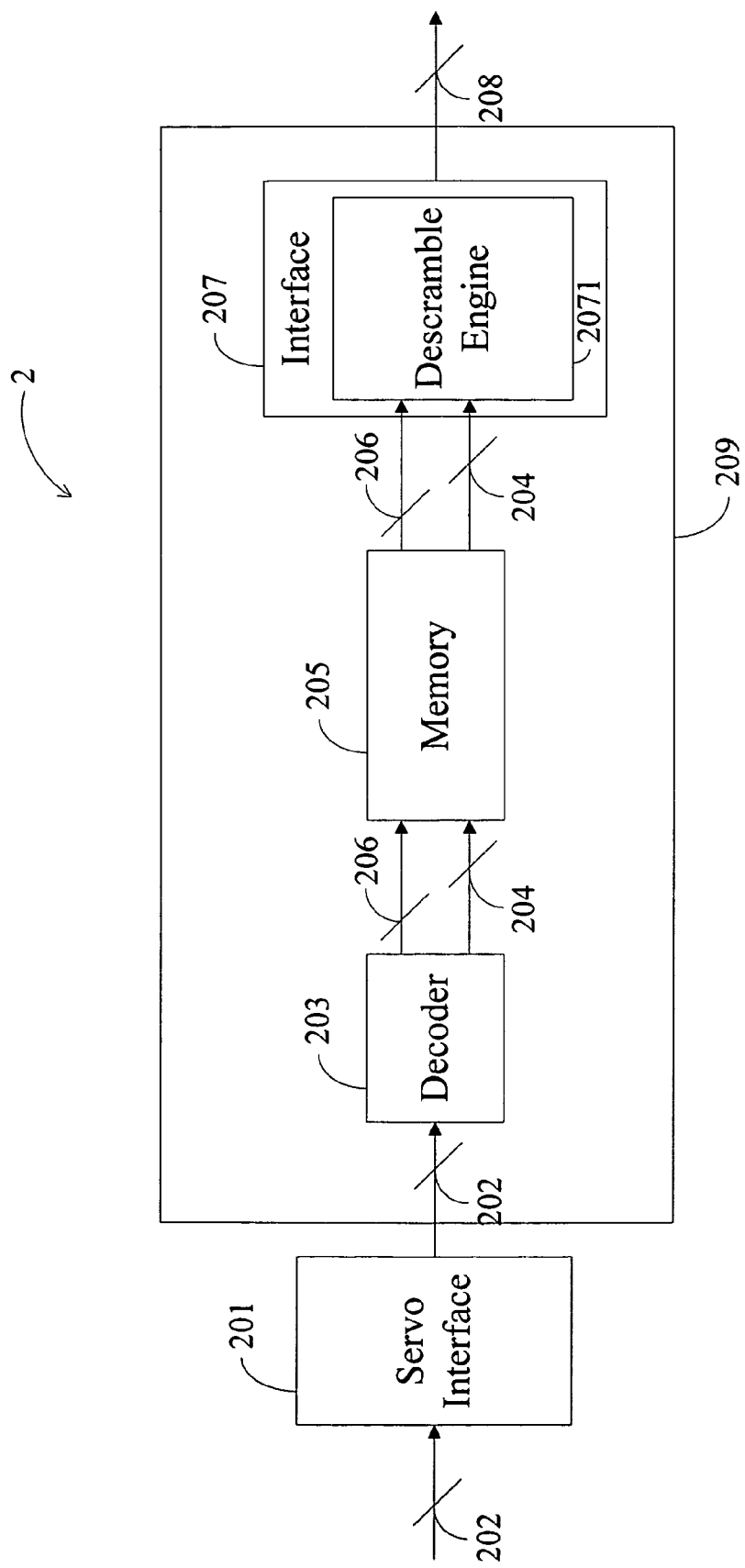
FIG. 2 is a block diagram of a first embodiment of the present invention.

A first embodiment of the present invention is a system for processing a data retrieved from an optical storage medium, wherein the optical storage medium may be an optical disc such as a CD, VCD, DVD, HDDVD, BD or the like. As shown in FIG. 2, the system 2 comprises a servo interface 201 and an apparatus 209. The apparatus 209 comprises a decoder 203, a memory 205, and an interface 207. The servo interface 201 receives a data 202 from the optical storage medium and transmits it to the apparatus 209. The decoder 203 receives and decodes a part of the data 202 to generate the data 204 having been corrected and address information 206 corresponding to an address on the optical storage medium. The address information 206 records relative physical position information of the decoded data 204 on the optical storage medium. That is, the address responds to the data 204. This means that the address information 206 carries the information of part of the data 202 which have been corrected by the decoder 203. The memory 205 stores the address information 206 and the data 204. The interface 207 comprises a descramble engine 2071 for descrambling the data 204. After the descrambling, the interface 207 outputs the descrambled data 208 to a host.

Figure 1:
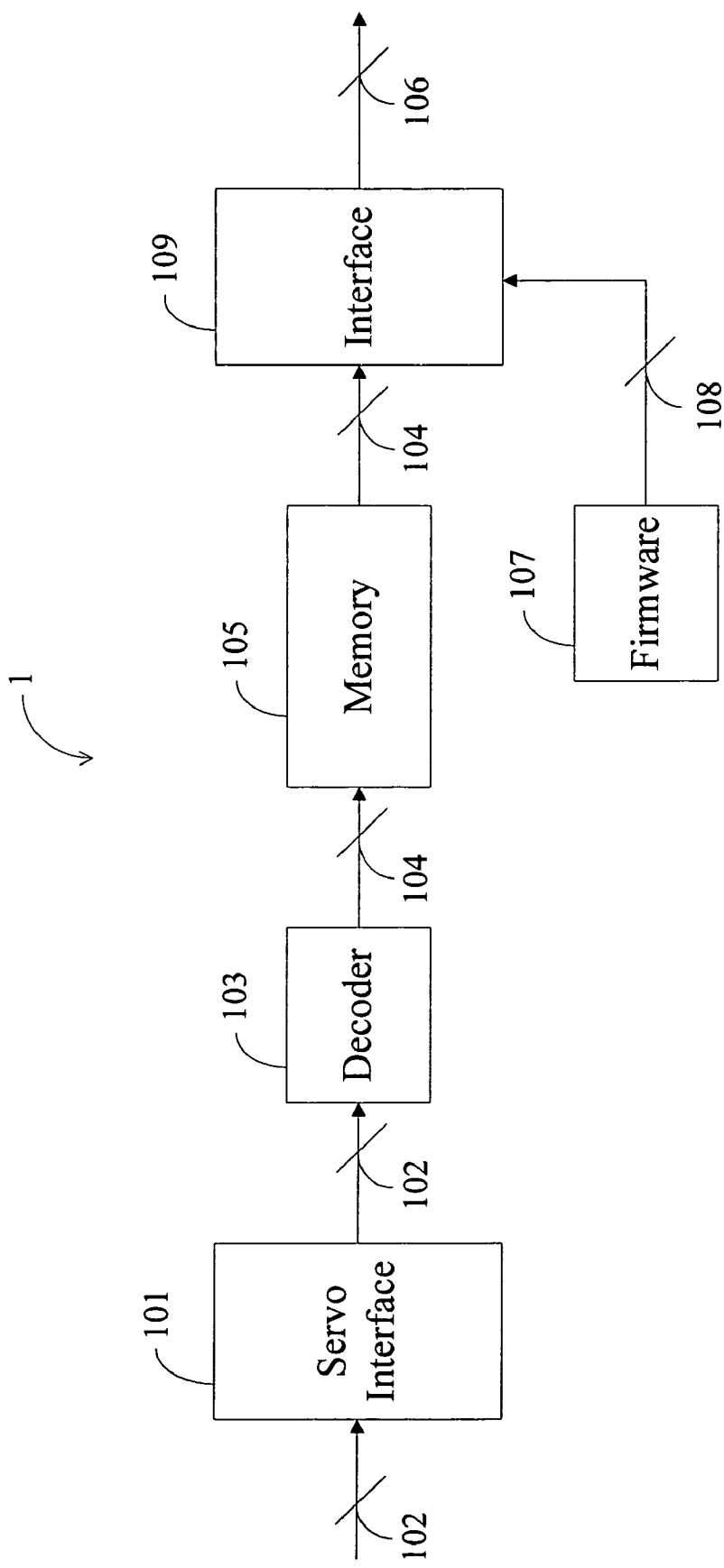
FIG. 1 is a block diagram of an optical access system of the prior art.

The descramble engine 2071 further comprises an LFSR (not shown). When the descrambling is interrupted because, for example, a replacement for a defect is required to be read from a position other than the current position of the optical storage medium, the descramble engine 2071 is temporarily terminated. After the interruption, the descramble engine 2071 continues descrambling, and the address information 206 is retrieved to activate the LFSR to continue descrambling the decoded data 204. More specifically, the address information 206 provides information of the address on the optical storage medium before the decoding is finished. Therefore, the descrambling is able to continue by retrieving the address information 206 without re-initializing the LFSR from the beginning. Moreover, the firmware 108 in FIG. 1 is unnecessary in the first embodiment of the present invention.

If the optical storage medium is a BD, the decoder 203 decodes the data 202 in unit of clusters. If the optical storage medium is an HD-DVD, the decoder 203 decodes the data 202 in unit of sectors.

Figure 3:
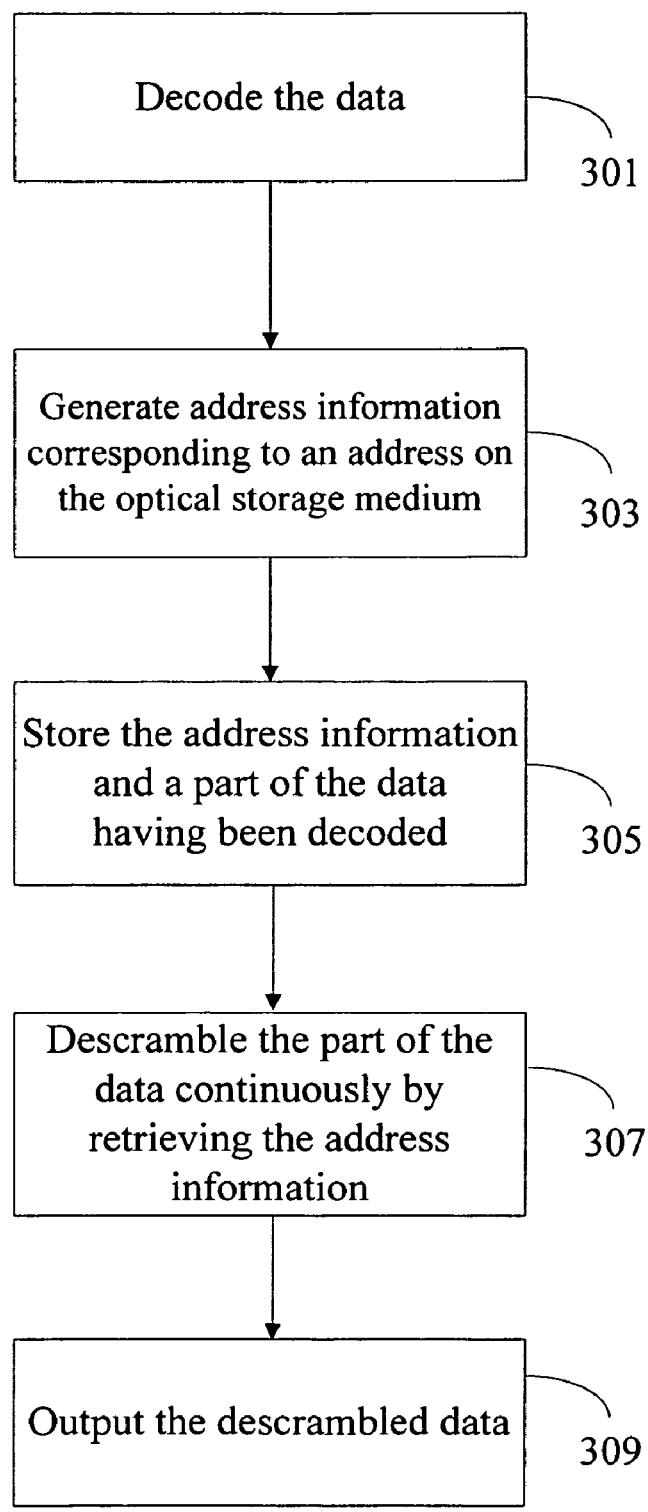
FIG. 3 is a flow chart of a second embodiment of the present invention.

A second embodiment of the present invention is a method for descrambling a data retrieved from an optical storage medium, wherein the optical storage medium may be an optical disc such as a CD, VCD, DVD, HDDVD, BD or the like. As shown in FIG. 3, the method comprises the following steps. In step 301, a decoder, such as the decoder 203, decodes the data retrieved from the optical storage medium. Then step 303 is executed in which the decoder generates address information corresponding to an address on the optical storage medium. In step 305, a memory, such as the memory 205, stores the address information and a part of the data having been decoded. In step 307, a descramble engine, such as the descramble engine 2071, descrambles the part of the data continuously by retrieving the address information after the data decoding is interrupted. In step 309, an interface, such as the interface 207, outputs the descrambled data.

The method further comprises a step of provides an LFSR. In particular, the LFSR is embedded in the descramble engine. Step 307 further comprises a step of activating the LFSR in response to the address information.

Similarly, if the optical storage medium is a BD, step 301 decodes the data in unit of clusters. If the optical storage medium is a HD-DVD, step 301 decodes the data in unit of sectors.

In addition to the steps shown in FIG. 3, the second embodiment is able to execute all of the operations or functions recited in the first embodiment.

After the descrambling is interrupted because, for example, a replacement for a defect is required to be read from the optical storage medium, step 307 is executed to continue the descrambling. At this moment, the address information is retrieved to activate the LFSR to continue descrambling. More specifically, the address information provides information of the address on the optical storage medium before which the decoding is finished. Therefore, step 307 is able to be executed without re-initialing the LFSR from the beginning.

Accordingly, the present invention may re-activate the LFSR in response to the address information that is stored in the memory. When the descrambling continues after the decoding is interrupted, the LFSR does not have to be re-initialized. The processing speed of the systems or apparatuses in accordance with the present invention will not be sacrificed due to the re-initialization of the LFSR.

The above disclosure is related to the detailed technical contents and inventive features thereof. People skilled in this field may proceed with a variety of modifications and replacements based on the disclosures and suggestions of the invention as described without departing from the characteristics thereof. Nevertheless, although such modifications and replacements are not fully disclosed in the above descriptions, they have substantially been covered in the following claims as appended.

What is claimed is:

1. An apparatus for descrambling a data retrieved from an optical storage medium, comprising:
    a decoder for decoding the data and generating address information corresponding to an address on the optical storage medium, the address responding to a part of the data having been decoded;
    a memory device for storing the address information generated from the decoder and the part of the data; and
    a descramble engine comprising a linear feedback shift register (LFSR) for continuing descrambling the part of the data by retrieving the address information without having to reinitialize the LFSR by a firmware;
    wherein the address information is used to record relative physical information of the decoded data on the optical storage medium, and to activate the LFSR to continue descrambling.

2. The apparatus as claimed in claim 1, further comprising an interface for outputting the descrambled data, wherein the descramble engine is embedded in the interface.

3. The apparatus as claimed in claim 1, wherein the optical storage medium is a blue-ray disc.

4. The apparatus as claimed in claim 3, wherein the decoder decodes the data in unit of clusters.

5. The apparatus as claimed in claim 1, wherein the optical storage medium is a high definition DVD (HD-DVD).

6. The apparatus as claimed in claim 5, wherein the decoder decodes the data in unit of sectors.

7. A system for processing a data retrieved from an optical storage medium, comprising:
    a servo interface for inputting the data;
    a decoder for decoding the data and generating address information corresponding to an address on the optical storage medium, the address responding to a part of the data having been decoded;
    a memory device for storing the address information generated from the decoder and the part of the data; and
    an interface comprising a descramble engine comprising a linear feedback shift register (LFSR) for continuing descrambling the part of the data by retrieving the address information without having to reinitialize the LFSR by a firmware, the interface outputting the descrambled data;
    wherein the address information is used to record relative physical information of the decoded data on the optical storage medium, and to activate the LFSR to continue descrambling.

8. The system as claimed in claim 7, wherein the optical storage medium is a blue-ray disc.

9. The system as claimed in claim 8, wherein the decoder decodes the data in unit of clusters.

10. The system as claimed in claim 7, wherein the optical storage medium is a high definition DVD (HD-DVD).

11. The system as claimed in claim 10, wherein the decoder decodes the data in unit of sectors.

12. A method for descrambling a data retrieved from an optical storage medium, the method implemented on an apparatus comprising a microprocessor and comprising the steps of:
   decoding the data using the microprocessor;
   generating address information corresponding to an address on the optical storage medium;
   storing the address information generated from the decoder and a part of the data having been decoded; and
   descrambling the part of the data continuously by retrieving the address information using a descramble engine comprising a linear feedback shift register (LFSR), and without having to reinitialize the LFSR by a firmware;
   wherein the address information is used to record relative physical information of the decoded data on the optical storage medium, and to activate the LFSR to continue descrambling.

13. The method as claimed in claim 12, further comprising the step of:
   outputting the descrambled data.

14. The method as claimed in claim 12, wherein the optical storage medium is a blue-ray disc.

15. The method as claimed in claim 14, wherein the data is decoded in unit of clusters.

16. The method as claimed in claim 12, wherein the optical storage medium is a high definition DVD (HD-DVD).

17. The method as claimed in claim 16, wherein the data is decoded in unit of sectors.

18. An apparatus for descrambling a data retrieved from an optical storage medium, comprising:
   a decoder for decoding the data and generating address information recording information of relative physical position of a part of the data having been decoded, wherein the relative physical position is on the optical storage medium;
   a memory device for storing the address information and the part of the data; and
   a descramble engine comprising a linear feedback shift register (LFSR) for continuing descrambling the part of the data by retrieving the address information without having to reinitialize the LSFR by a firmware;
   wherein the address information activates the LFSR to continue descrambling.

* * * * *